US005328732A

United States Patent [19]

Renna

[11] Patent Number: 5,328,732

[45] Date of Patent: Jul. 12, 1994

[54] CYLINDRICAL PACKAGE STUFFING MATERIAL

[76] Inventor: Douglas J. Renna, 131 Munro Blvd., Valley Stream, N.Y. 11581

[21] Appl. No.: 30,776

[22] Filed: Mar. 12, 1993

[51] Int. Cl.5 .............................................. B29D 22/00

[52] U.S. Cl. .................................. 428/34.2; 206/814; 229/4.5; 229/93; 138/128; 138/170; 428/543

[58] Field of Search ....................... 428/34.2; 206/814; 229/4.5, 93; 138/128

[56] References Cited

U.S. PATENT DOCUMENTS 2,138,568 11/1938 Brandenberger .................. 138/128

*Primary Examiner*—George F. Lesmes
*Assistant Examiner*—Christopher W. Raimund
*Attorney, Agent, or Firm*—Bauer & Schaffer

[57] ABSTRACT

Package stuffing material is formed by rolling strips of relatively rigid paper stock to cylindrical bodies. The strip is rolled so that the outer longitudinal edge is adhered to the outer surface of the cylinder while the inner end hangs free. The inner end extends between a 90° to 180° arc along the inner wall and when the cylindrical is pressed its edge engages the wall substantially limiting the degree of distortion.

3 Claims, 1 Drawing Sheet

FIG. 1
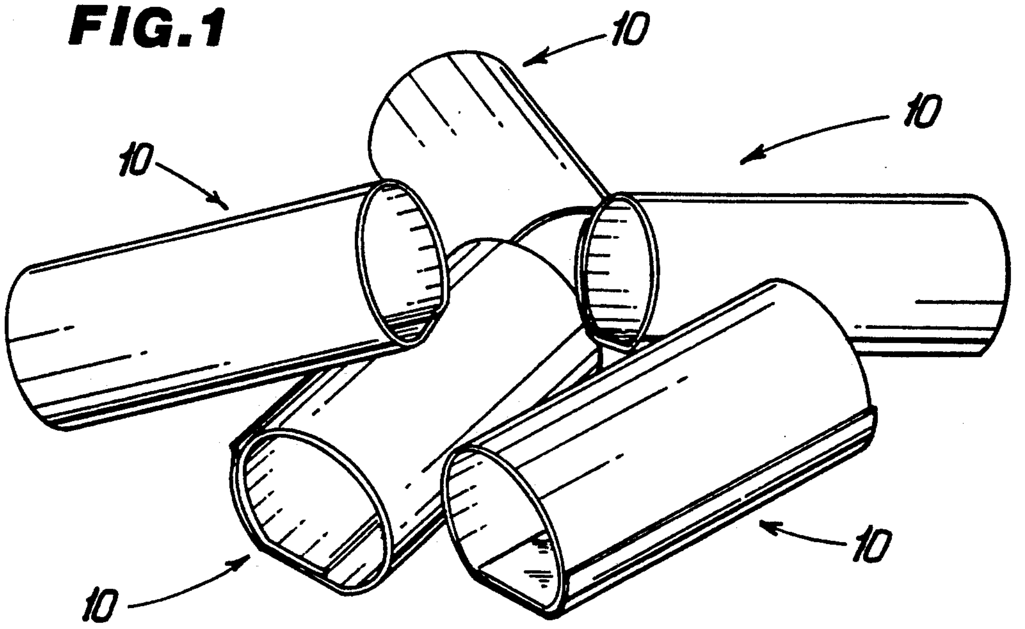
FIG. 2
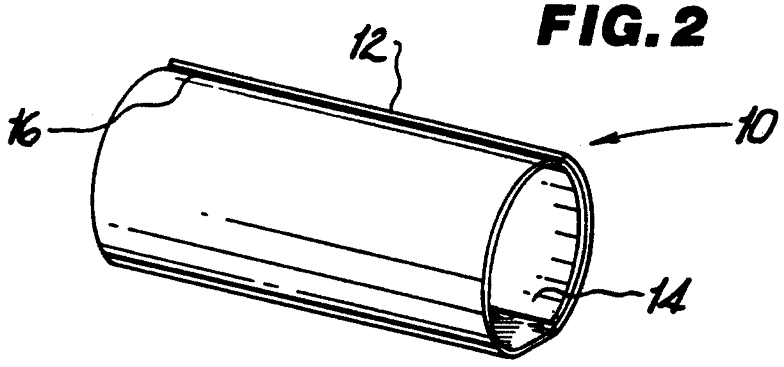
FIG. 3
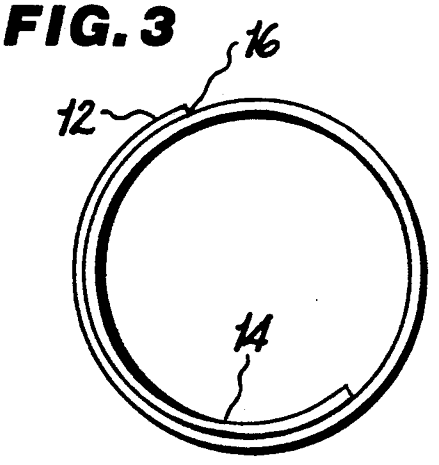
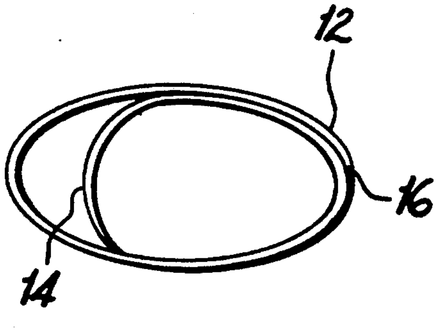
FIG. 4

CYLINDRICAL PACKAGE STUFFING MATERIAL

BACKGROUND OF THE INVENTION

The present invention relates to packaging materials and in particular to material used to stuff and fill shipping cartons or crates to protect small, valuable or fragile articles.

In my earlier copending application Ser. No. 940,549 filed on Sep. 4, 1992, I disclosed a package stuffing material useful as a substitute for the common plastic "peanut" stuffing material. My earlier package materials were light in weight and made of highly biodegradable paper material. They, therefore, present a significantly reduced environmental problem.

On the other hand, the earlier stuffing material required a time-consuming and somewhat costly method of forming, preferably by molding, of the individual units of the stuffing material, as well as relatively large machinery therefor. As a consequence, the known packaging material had to be made long before use and had to be stored and shipped in bulk to the place of use.

It is the object of the present invention to provide an improved biodegradable paper material, which is simpler and more economical, yet provides substantially greater degree of filling.

These objects, as well as others, will be apparent from the foregoing disclosure.

SUMMARY OF THE INVENTION

According to the present invention, there is provided package stuffing material comprising a plurality of substantially hollow cylindrical bodies capable of filling a volume substantially greater than the sum of their individual volumes. The bodies are formed by curling or rolling a strip of flat paper stock into a cylinder, with an overlying outer edge sealed to the outer surface of the cylinder and an underlying edge extending tongue-like freely into the interior of the cylinder. The paper stock is preferably of thin card, kraft or heavy calendared material which when rolled into cylindrical form is capable of maintaining shapes. For example, 80 lb. card stock may be used.

The tongue-like inwardly directed extension acts as a diametric strut within the cylinder, which when radially pressed causes the tongue to engage the inner wall of the cylinder opposite to the line of adhesion, and thus increasing radial rigidity of the roller cylinder.

This construction provides a reinforced cylindrical truss which has considerable strength against compression and twist. When randomly placed within a container, the bodies abut in such a manner as to provide considerable space and interstices between them so as to significantly increase their overall volume.

Full details of the present invention are set forth in the following description and in the accompanying drawings.

BRIEF DESCRIPTION OF THE DRAWINGS

In the drawings:

FIG. 1 is a perspective view of the plurality of package stuffers illustrating their collective use;

FIG. 2 is a perspective view of a package stuffer of the present invention;

FIG. 3 is a cross sectional view of the package stuffer taken in the direction 3—3; and FIG. 4 is an end view of a pile of package stuffer of the present invention illustrating its form when pressed.

DESCRIPTION OF THE INVENTION

Turning now to the drawings, the package stuffers or packaging material of the present invention comprises a plurality of individual cylindrically shaped hollow bodies, generally depicted by the numeral 10, which as seen in FIG. 1 occupy collectively a volume greater than the sum of their individual volumes.

Each of the bodies are preferably approximately 2 inches in length and between ½ to 1 inch in diameter, although the size is not critical and may vary as desired. As seen in FIGS. 2 and 3, each body 10 comprises a strip of shaped retaining paper stock rolled transversely to its longitudinal axis on itself to the desired diameter, so that the outer longitudinal end 12 overlaps the outer surface of the cylinder thus formed. The inner longitudinal end 14 forms underlying tab or tongue-like extension 16 having a length greater than a 90° arc and less than a 180° arc so that it extends by virtue of its normal stiffness along the inner circumference of the rolled cylinder. The overlapping outer end 12 is pasted, or otherwise adhered as at 16 to the outer surface of the rolled cylinder along its entire length. The underlying tab 14 depends tongue-like freely along the inner wall of the cylinder from the line of adhesion toward the opposite portion of the inner wall.

It is this tongue-like extension within the cylinder that provides the cylinder with full shape retention and non-compressibility when in use, thereby providing maximum space filling.

The paper stock is preferably semi-rigid "fools cap" resin treated Kraft or thin cardboard. Preferably stock between 40 lb. and 120 lb. paper is to be used.

It will be seen from the figures that the package stuffing of the present invention can be easily used in lieu of conventional "peanuts" or other package stuffing, by simply disposing a plurality of them with a container in random unoriented manner so that they lie helter-skelter in contact with each other. The small, valuable or fragile article may be easily nested or embedded in the mass of the package stuffing. In such nesting the individual pieces of stuffing material press against each other, seeking initially to radially flatten the cylinders. However, as force is radially applied the act of distortion itself causes the small tab 14 to move away from the inner wall surface, so as to assume the position shown in FIG. 4 where its edge and not its surface engages the inner wall of the cylinder opposition the adhesion line 16. In this manner, since edge-like force is applied to tab 14, the tab 14 actually stiffens into a diametric strut preventing further distortion of the cylinder. Should the cylindrical stuffers roll about, the position of the tab 16 will also follow, constantly engaging the inner wall and thus keeping the form of the cylinder rigid, albeit somewhat deformed into an ellipse.

While the thin paper stock material is highly desirable, other paperboard material can be used provided such material can be rolled into retaining configuration shapes, be bio-degradable and have an ability to fill a volume substantially larger than that of the sum total volume of the individual bodies used.

Various modifications and changes may be made. The present disclosure is intended, therefore, to provide an illustration of the invention the invention should not be limited thereto.

What is claimed is:

1. Package stuffing material comprising a plurality of hollow bodies adapted to fill a volume greater than the sum of their individual volumes, each body comprising a strip of shape retaining paper stock material rolled into a cylinder having its outer end adhered adjacent its longitudinal edge to the outer surface of the cylinder and having its inner end freely extending along the inner wall of said cylinder so as to be circumferential slidable therealong to place its free inner longitudinal edge in engagement with the inner wall on application of a radial force to the cylinder.

2. The material according to claim 1, wherein said inner end extends between 90° and 180° arc about the inner wall of said cylinder.

3. The material according to claim 1, wherein said paper stock is semi-rigid paper stock of between 40 lb. and 120 lb. weight.

* * * * *